United States Patent
Masotti et al.

[11] Patent Number: 6,066,098
[45] Date of Patent: May 23, 2000

[54] METHOD FOR ENHANCING THE DIAGNOSTIC POWER OF ULTRASONIC SCANNING SYSTEMS BY USING REAL-TIME SPECTRAL MAPS, AND DEVICE OPERATING BY SAID METHOD

[75] Inventors: Leonardo Masotti; Elena Biagi, both of Florence; Marino Cerofolini, Arezzo; Alberto Bertini, Florence; Marco Calzolai, Florence; Andrea Bigagli, Florence; Leonardo Galardi, Florence; Carlo Giovannucci, Florence, all of Italy

[73] Assignee: Esaote S.p.A., Italy

[21] Appl. No.: 09/097,166

[22] Filed: Jun. 12, 1998

[30] Foreign Application Priority Data

Jun. 13, 1997 [IT] Italy .................................. FI97A0141

[51] Int. Cl.[7] ...................................................... A61B 8/00
[52] U.S. Cl. ............................................................ 600/443
[58] Field of Search ..................... 600/442, 443; 73/602; 382/128, 132, 274, 276

[56] References Cited

U.S. PATENT DOCUMENTS

| | | | |
|---|---|---|---|
| 5,000,183 | 3/1991 | Bonnefous | 600/437 |
| 5,253,530 | 10/1993 | Letcher, III et al. | 600/442 X |
| 5,417,215 | 5/1995 | Evans et al. | 600/442 |
| 5,497,777 | 3/1996 | Abdel-Malek et al. | 600/443 |
| 5,526,816 | 6/1996 | Arditi | 600/458 |
| 5,619,998 | 4/1997 | Abdel-Malek et al. | 600/453 X |
| 5,638,823 | 6/1997 | Akay et al. | 600/528 |

OTHER PUBLICATIONS

Olivier Rioul and Marti Vetterli, Oct. 1991, Wavelets and Signal Processing, *IEEE SP Magazine*.

A. Abbate, J. Koay, J. Frankel, S.C. Schroeder ad P.Das, 1994, Application of Wavelet Transform Signal Processor to Ultrasound, 1994 Ultrasonics Symposium.

John H. Letcher, Dec. 3, 1991, An Imaging Device htat Uses the Wavelet Transformation as the Image Reconstruction Algorithm, *International Journal of Imaging Sysetems and Technology, vol. 4, 98–108*.

Brani Vidakovic and Peter Müller, 1991, Wavelets for Kids, *Published by the Institute of Statistics and Decision Science, Duke University*.

Primary Examiner—Francis J. Jaworski
Attorney, Agent, or Firm—McGlew and Tuttle, P.C.

[57] ABSTRACT

A method of analyzing an ultrasonic signal is described. The method is characterized in that the ultrasonic signal (f(t)) is sampled and digitized and in that a discrete wavelet transform is applied to the sampled and digitized signal to obtain a spectral map of the sampled signal

20 Claims, 5 Drawing Sheets

METHOD FOR ENHANCING THE DIAGNOSTIC POWER OF ULTRASONIC SCANNING SYSTEMS BY USING REAL-TIME SPECTRAL MAPS, AND DEVICE OPERATING BY SAID METHOD

DESCRIPTION

The present invention relates to a method and a device for increasing the diagnostic power of ultrasonic scanning systems.

The typical characteristic of medical diagnostics is that of using real-time data with noninvasive techniques. This has led to the great success of ultrasonic investigation applied in various cases of pathological examnination.

At present, ultrasonic scanners base their tissue analysis on the different levels of echo generation and therefore on the amplitude of the reflected signal. The objective of these instruments is to produce images (called "B-mode maps"), which are as detailed as possible, of the area of tissue analyzed. This requires a high spatial resolution and consequently the use of a wide-band probe with excellent focusing. The analyzed signal is frequently at a level comparable to noise of various kinds and therefore is such that it generates images which are not easily read.

Furthermore, biological tissues are not characterized only by the level of echo generation, in other words their acoustic impedance, but also by their frequency response. In fact, the tissue, when interacting with the acoustic beam, acts as a filter which is selective in frequency according to the elements of which it consists.

The object of the present invention is to provide a method and a device which make it possible to extract effectively and in real time this type of spectral data typical of a biological structure, in order to obtain spectral maps on line with the object of:

1. differentiating tissues;
2. determining with enhanced spatial resolution the profiles of discontinuities and identifying structural details which are not recognizable by the conventional ultrasonic scanning techniques;
3. detecting the presence of blood in vessels and cavities without using the Doppler effect;
4. carrying out high-sensitivity contrastography based on the nonlinear response of the contrast fluids interacting with the ultrasonic beam.

Essentially, the invention provides a method of analysis of an ultrasonic signal, characterized in that it samples the signal, digitizes the sampled signal and applies a discrete wavelet transform to the sampled and digitized signal to obtain a spectral map of the sampled signal.

In a practical embodiment, the sampled and digitized signal is filtered through a subband encoding algorithm.

Further advantageous embodiments of the method are illustrated in the following text and are indicated in the attached claims.

The application of time-frequency transforms to signals of various types, and in particular to ultrasound, is known Among more recently developed time-frequency transforms, wavelet transforms have been shown to provide a particularly potent and versatile tool for signal analysis.

The present invention is based on a new and original use of this mathematical tool for obtaining a method of digital processing of the ultrasonic signal and consequently for the construction of an ultrasonic scanner which operates by this method.

For a detailed discussion of the strictly mathematical aspects of the use of wavelet transforms, reference should be made to the appropriate literature, and in particular, among others, to O. Rioul and M. Vetterli, "Wavelets and Signal Processing", IEEE SP Magazine, October 1991, pp. 14 ff.; A. Abbate et al., "Application of Wavelet Transform Signal Processor to Ultrasound", in Ultrasonic Symposium 1994, pp. 1147 ff.; J. H. Letcher, "An Imaging Device that Uses the Wavelet Transformation as the Image Reconstruction Algorithm", in Int. Jour. Imaging Syst. and Tech., vol. 4, 98–108, 1992; and B. Viadokovic and P. Mueller, "Wavelets for Kids—A tutorial introduction", published by the Institute of Statistics and Decision Sciences, Duke University, Durham, N.C. 27708-0251, USA. The contents of the references cited here are incorporated in the present description.

The method according to the invention can be applied with an ultrasonic scanner comprising a sampling and acquisition card, connected to the receiving circuit of the ultrasonic scanner, and a calculation system comprising a filter to whose input is applied the sampled and digitized signal supplied from the sampling and acquisition card and at whose output the coefficients of the discrete wavelet transform of the sampled signal are obtained.

In practice, the filter may be formed by an integrated FIR filter, controlled by a digital signal processor. A single filter or a plurality of filters may make it possible, by suitable programing, to provide a plurality of filter structures in parallel for obtaining more than one frequency map simultaneously and for constructing composite images.

The use of powerfull instruments such as a digital signal process and an integrated FIR filter also makes it possible to obtain further advantages, such as the possibility of changing the filter coefficients, in other words of changing the applied wavelet function. This may be useful because better results can be obtained by selecting a specific wavelet function according to the spectral data which are to be extracted from the signal.

The digital processing of the sampled and filtered signal also makes it possible to recombine the spectral images obtained with the conventional "B-mode" representation of conventional ultrasonic scanners, for example by superimposition of the maps, adjacent positioning of the maps, representation of the maps in false color, or three-dimensional representation of the maps.

The use of a digital signal processor combined with an integrated filter or with a plurality of integrated filters also makes it possible to reprogram the filter to examine the sampled signal in different spectral bands and also to reprogram the filter so that it operates on the signal with transforms other than the discrete wavelet transform.

The invention will be better understood from the description and the attached drawing, which shows a nonrestrictive practical embodiment of the invention. In the drawing.

Figure 1:
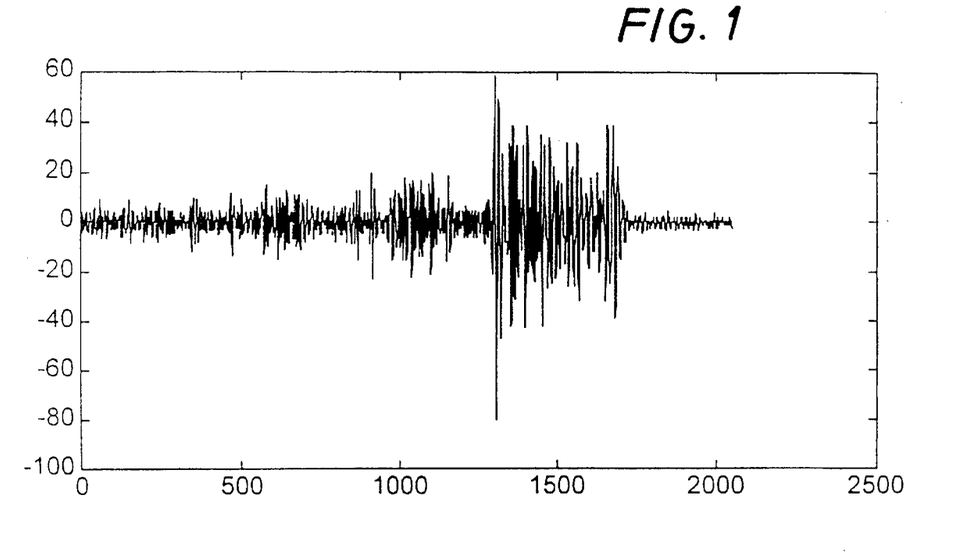
FIG. 1 shows the return ultrasonic signal from an object reproducing the structure of a human organ.
Figure 2:
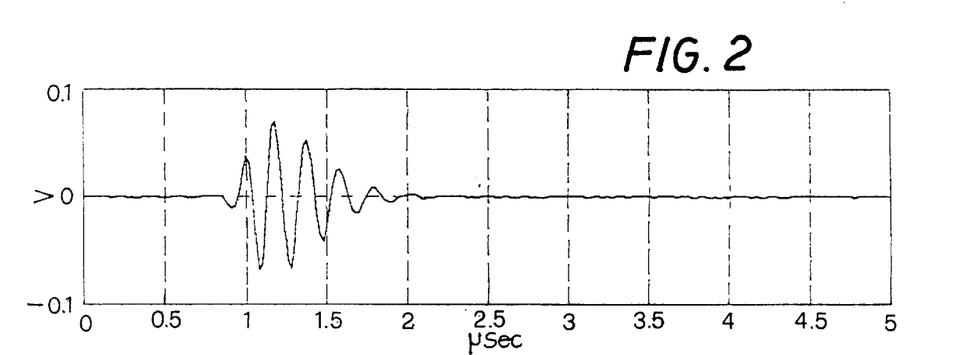
FIG. 2 shows the ultrasonic signal transmitted to obtain the return signal shown in FIG. 1.

FIG. 1 shows one trace of the ultrasonic response signal of an object reproducing the structure of the liver, to which has been sent a signal having the waveform shown in FIG. 2. According to the invention, the response signal is sampled and the discrete wavelet transform (DWT) is applied to the sampled signals to obtain a spectral map.

Figure 4:
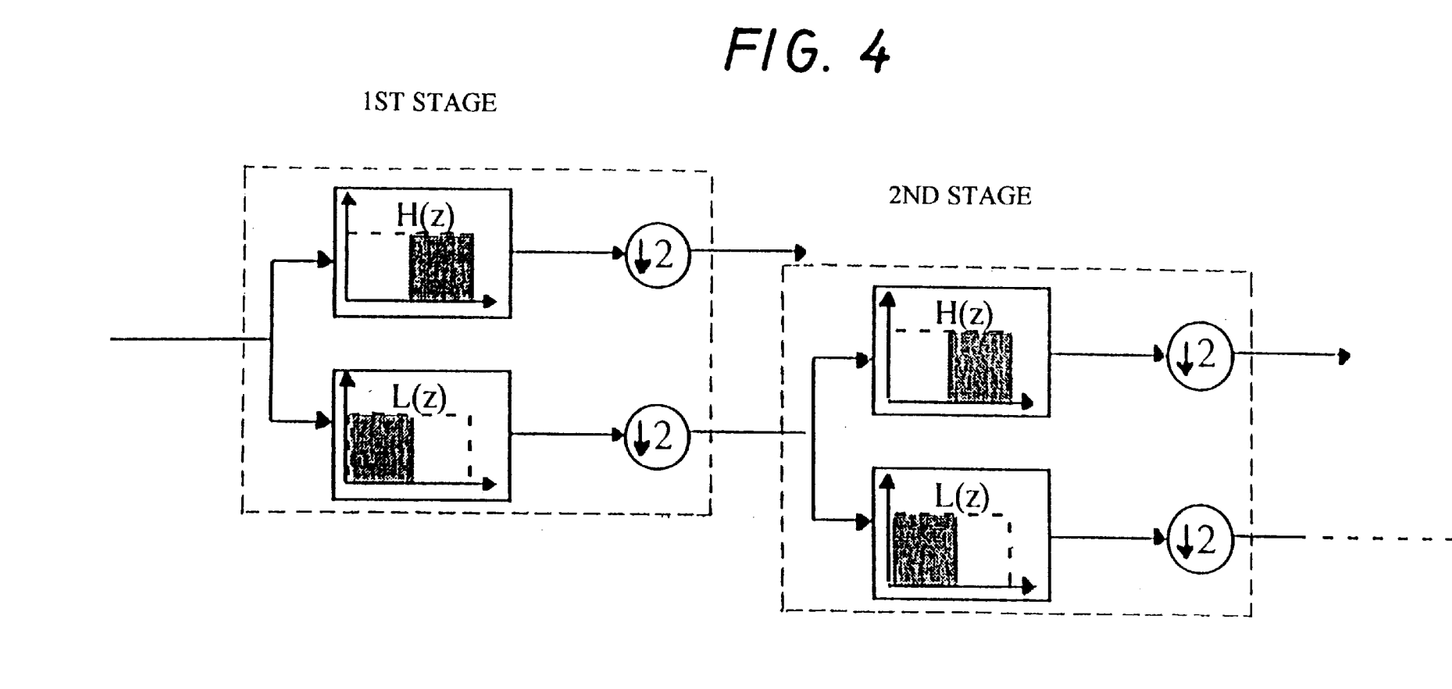
FIG. 4 shows the Mallat filter algorithm for obtaining the useful spectral bands from the ultrasonic signal shown in FIG. 1.

The filter algorithm used in this example of an embodiment, called the subband encoding algorithm or Mallat algorithm, can be represented schematically as in FIG. 4. It consists of a set of stages in series, each of which contains a high-pass filter and a low-pass filter, whose coefficients are defined below, and corresponding decimations by two. In FIG. 4 the filters are indicated with reference to the corresponding Z transform for greater convenience.

The output of the low-pass filter of each stage forms the input of the high-pass and low-pass filters of the next stage, while the output of each high-pass filter of the different stages forms a set of coefficients of resolution at the various spectral bands, and a decimation by two is carried out at the output of each band-pass filter.

The theoretical mathematical treatment of the Mallat algorithm is known, and for a fuller discussion reference should be made, for example, to Olivier Rioul et al., "Wavelets and Signal Processing", IEEE SP Magazine, October 1991, pp. 14 ff. As is known from the theoretical treatment reported in the reference cited here and in others known to persons skilled in the art, the coefficients $a_{m,n}$ and $d_{m,n}$ at the output of the stages of the algorithm are defined recursively as follows:

$$\begin{cases} d_{m,n} = \sum_{-\infty}^{+\infty} {}_k h_{2n-k} a_{m-1,k} \\ a_{m,n} = \sum_{-\infty}^{+\infty} {}_k g_{2n-k} a_{m-1,k} \end{cases}$$

where $g_n$ and $h_n$ are the coefficients of the low-pass and high-pass filters respectively, defined by:

$$\begin{cases} g_n = \sqrt{2} \int \phi(t-n)\phi(2t)dt \\ h_n = (-1)^n g_{-n+1} \end{cases}$$

where the function $\phi$ is the scaling function for which $$\phi_{m,n} = a_0^{-m/2} \phi(a_0^{-m}t - nb_0)$$

where $a_0$ and $b_0$ are positive integers, for example $a_0=2$ and $b_0=1$. The set $\{\phi_{m,n}\}$ defines an orthonormal basis for a space $V_m$ which approximates the function f(t) with a resolution $2^m$.

The scaling function is related to a corresponding wavelet function defined by the sequence $$\psi_{m,n} = 2^{-m/2}\psi(2^{-m}t-n)$$

The functions $\phi$ and $\psi$ are defined after the choice of the family and order of the wavelet transform which is to be applied, and are known from the literature, for example from the reference cited above.

Given a sampled ultrasonic response signal f(t), of the type shown in FIG. 1 for example, this may be considered as the sequence of the coefficients $a_{0,n}$ of the highest-resolution approximation of the signal f(t). Subjecting this signal to a set of recursive filtering operations according to the Mallat subband encoding algorithm shown in FIG. 4 produces a set of coefficients $a_{m,n}$, each representing an approximation to the signal, with a time resolution gradually decreasing with an increase in m, and a set of detail coeffecients $d_{m,n}$, which represent the spectral content of the signal in various frequency bands. Essentially, what is carried out by the iterative application of the Mallat algorithm shown schematically in FIG. 4 is an operation of extraction of the spectral content of the signal in gradually decreasing frequency bands, to separate the spectral content in one band from the spectral content in the successive bands.

Each approximation $a_{m,n}$ can be analyzed into an approximation with lower resolution $a_{m+1,n}$ and a detail signal $d_{m+1,n}$. Thus the signal f(t) is essentially divided into "detail" sub-sequences $d_{m,n}$.

Figure 3:
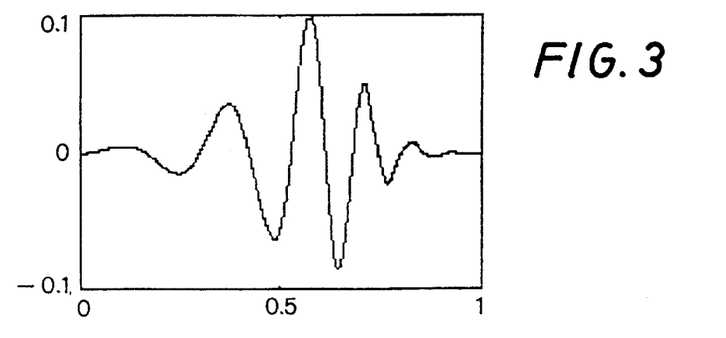
FIG. 3 shows the wavelet function used for filtering the ultrasonic signal shown in FIG. 1.
Figure 5:
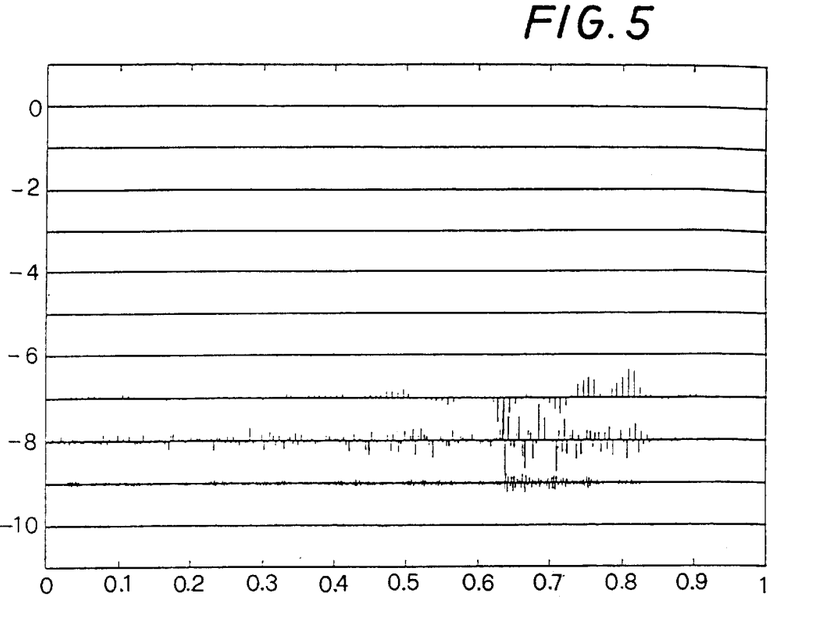
FIG. 5 shows the distribution of the coefficients obtained by filtering the signal shown in FIG. 1 with the algorithm shown in FIG. 4.

FIG. 5 shows, for the signal f(t) in FIG. 1 relating to a single trace of the ultrasonic scanning image, to which the subband encoding algorithm according to FIG. 4 is applied, the coefficients $d_{m,n}$ for various levels of resolution. The coefficients of the applied filters are those of the Daubechies wavelet transform of order 16 (see O. Rioul et al., "Wavelets and Signal Processing", cited above), shown in FIG. 3, which has been selected for its similarity to the ultrasonic signal in FIG. 2, among other reasons.

Figure 6:
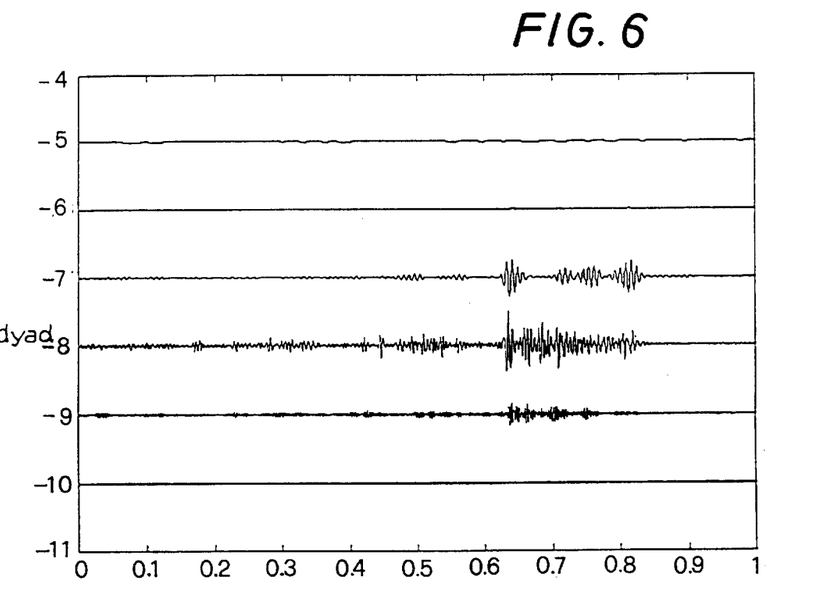
FIG. 6 is a time representation of the ultrasonic signal at the most significant scales.

FIG. 6 shows the time representation corresponding to the coefficients of FIG. 5 for the four most significant bands only (−7, −8, −9, −10), where approximately 98% of the energy of the signal is concentrated in the case under examination. Essentially, FIG. 6 shows the reconstruction of the signal in each individual subband, by a discrete wavelet transform which is the inverse of that applied for the subband encoding.

The superimposition of the reconstructed signals shown in FIG. 6 yields, with excellent approximation, the whole reconstruction of the original signal. This reconstruction, however, is not necessary for the purposes of the present invention, since it is possible to proceed to the direct display of the coefficients obtained by the filtering and to interpret the image obtained from this without reconstructing the original signal by means of the inverse transform. This enables the computational work to be halved in practical applications.

Although it is possible to make a device which executes, by software for example, the filtering of the sampled signal according to the recursive algorithm shown in FIG. 4, in the practical application it is convenient to use a hardware system capable of filtering the signal in real time. This may be made in various ways.

A first possible design is based on the fact that the various stages of the recursive algorithm shown in FIG. 4 are identical to each other. Each stage consists of two high-pass and low-pass filters which operate in parallel on the data supplied from the low-pass branch of the preceding stage. It is therefore possible to implement the algorithm shown schematically in FIG. 4 by using a single pair of FIR filters (one high-pass and one low-pass) and iterating the filtering by means of a temporary storage of the results of each stage so that they can subsequently be supplied as the input to the same filters in the next pass.

Figure 7:
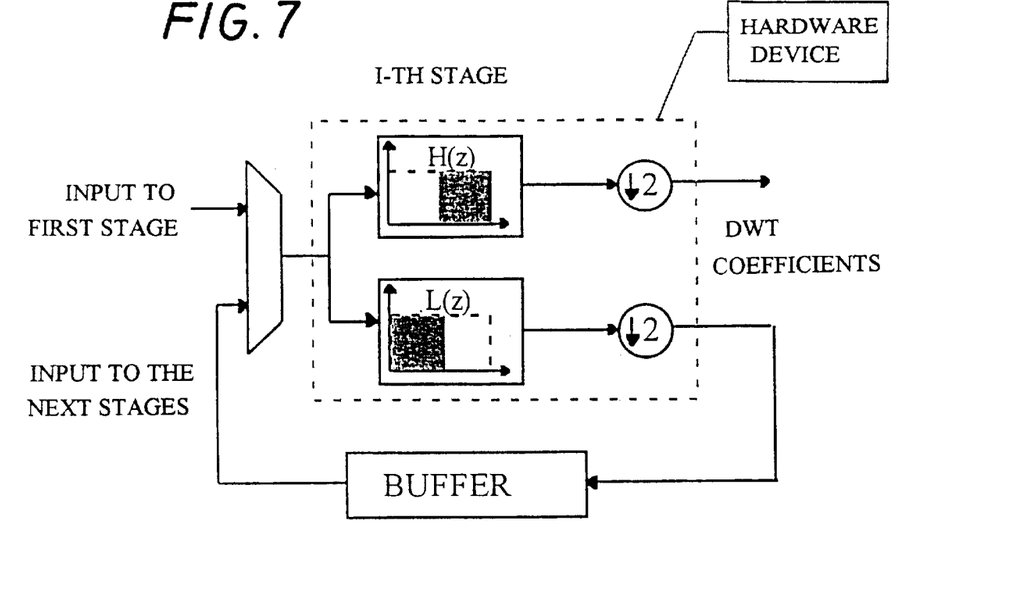
FIG. 7 is a diagram of the hardware implementation of the algorithm shown in FIG. 4.

This solution is shown schematically in FIG. 7; the output of the low-pass filter is decimated by two and temporarily stored in a storage buffer and then resupplied to the two filters H(z) and L(z). In the representation in FIG. 7, use is made of the notation relating to the Z transform of the time sequence, to which reference is made in the formulae shown above. In practice, L(z) and H(z) simply indicate in FIG. 7 the Z transform of the sequences g(n) and h(n) described above.

The diagram in FIG. 7 has the advantage of a particular simplicity of the filters to be implemented. However, it has the disadvantage of low accuracy.

This is because devices which implement this type of filter truncate the data at the output at a number of bits lower than that used internally during the calculations, and therefore the continuous operations of input and output typical of the iterative system in FIG. 7 result in a gradual degradation of the accuracy of the calculated coefficients with an increase in the number of iterations executed.

Moreover, in order to obtain the coefficients for the lowest frequencies, it is necessary to pass through all the preceding stages, with consequently extended calculation times.

As an alternative to the iterative configuration in FIG. 7, it is possible to implement the algorithm in FIG. 4 by means of a parallel system of equivalent filters. By using the following property of equivalence typical of the filters with decimation where H(z) and L(z) are defined as described above, it is possible to determine an equivalent filter for each stage of the algorithm in FIG. 4 and to use this equivalent filter to find the coefficients of any intermediate output, starting from the same input. For example, if the coefficients relating to the output of the second stage of the algorithm in FIG. 4 are to be found, it is possible to use the equivalent filter By repeating the procedure for each series of filters and decimations which are encountered by proceeding from the data input to any of the outputs of the coefficients $d_{m,n}$, the parallel arrangement of the filters is obtained, as shown in FIG. 8 in which, by way of example, it is limited to the first three stages.

In this configuration, the output coefficients of each parallel filter depend directly on the input data and the processing takes place with filters which vary with the frequency band which is to be analyzed. This makes it necessary to use as many different filters as there are bands under examination, but has the advantage of eliminating the dependence of each set of coefficients obtained on the intermediate data, and of providing a higher processing speed, depending on the particular form of implementation used.

Since, as shown in FIGS. 5 and 6, 98% of the energy of the return ultrasonic signal is concentrated in four frequency bands, the total number and the length of the equivalent filters to be used are relatively small. The parallel solution in FIG. 8 is therefore preferable to the iterative structure in FIG. 7.

Figure 8:
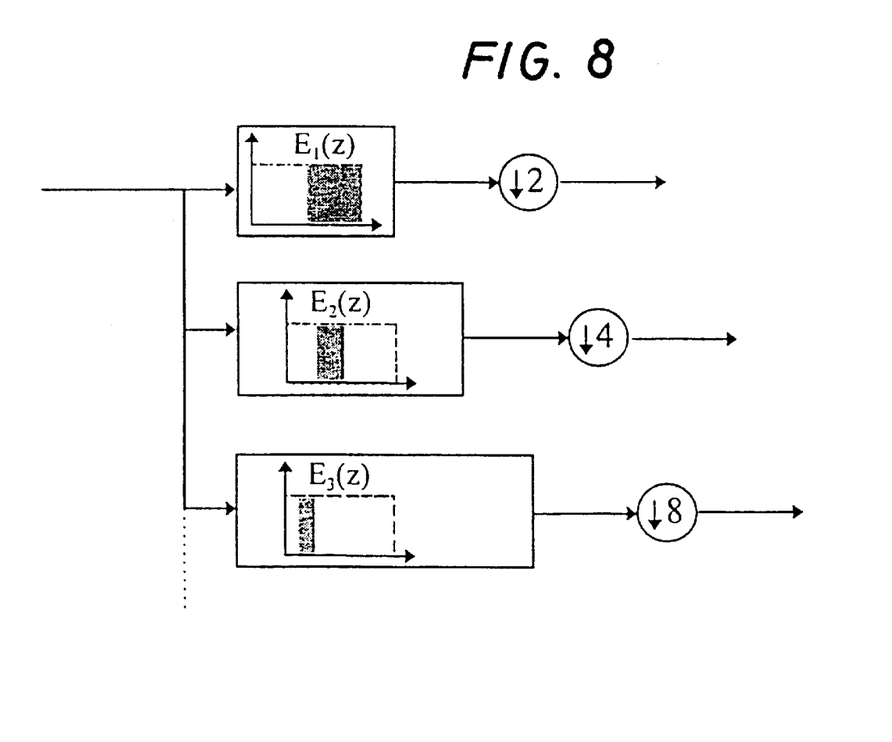
FIG. 8 shows a parallel-structure form of implementation of the algorithm shown in FIG. 4.
Figure 9:
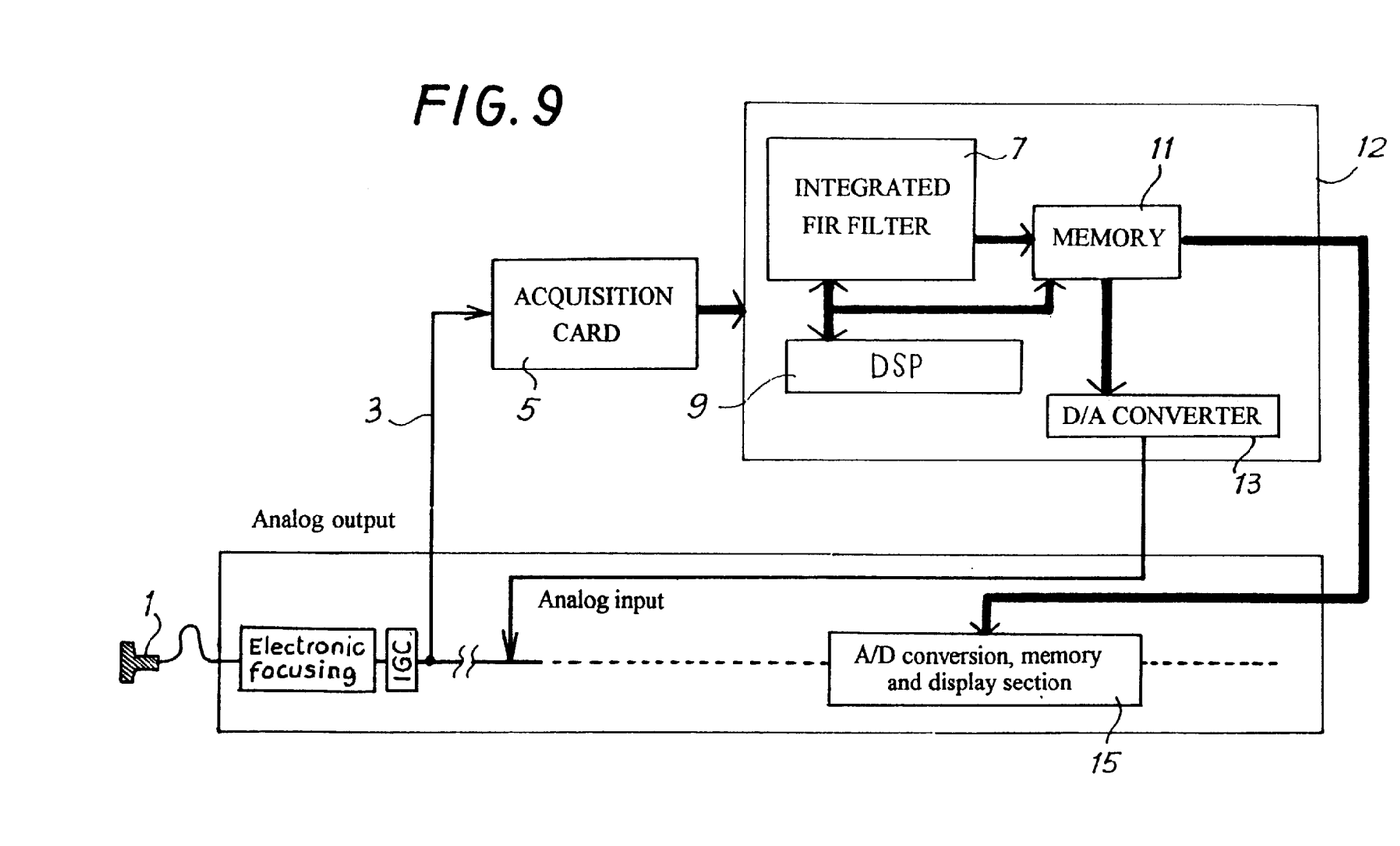
FIG. 9 is a block diagram of the instrument.

In the practical embodiment, the parallel filters of the layout shown in FIG. 8 may be made from commercially available electronic devices of various types. FIG. 9 shows the block diagram of an embodiment using a dedicated integrated circuit for the construction of the FIR filters arranged in parallel as shown in FIG. 8, controlled by a digital signal processor (DSP). In the diagram in FIG. 9, the number 1 schematically represents the transducer of the ultrasonic scanner, whose analog output 3 is connected to an acquisition card 5. A sampled and digitized signal f(n) is provided at the output of the acquisition card 5 and forms the input of the integrated FIR filter 7. This filter may consist of any suitable commercially available integrated circuit, for example the 43168 produced by Harris, the GF191 produced by Gennum, the GEC 16256 produced by Plessey, or the GC2011 produced by Graychip.

The FIR filter 7 is associated with a digital signal processor (DSP) 9 which operates as a controller which supervises the control, programming and configuration of the whole processing unit, including the handshake signals with the other interfaceable A/D acquisition circuits. The microcontroller 9 may be, for example, a Texas TMS 32031 DSP or other equivalent.

The integrated circuit 7 and the microcontroller 9 are associated with a memory 11 connected to a digital/analog converter 13 and to the digital stages of the ultrasonic scanner.

The operation of the device is as follows. The radio-frequency signal is taken from the receiving circuit of the ultrasonic scanner immediately after the time gain compensation unit (TGC) and is then digitized with a suitable sampling frequency, for example 40 MHz, and with 12 bits of resolution (or another suitable resolution) of the acquisition card 5. In practice, acquisition is carried out by individual traces until a frame or a portion of a frame is complete. The signal samples acquired for each individual trace are stored in a memory bank of the acquisition card until a complete frame or a portion of a frame has been acquired, and only at this point are the stored data sent to the calculation card comprising the DSP 9 and the FIR filter 7. During the passage of the data to the calculation card, the acquisition card begins to acquire the signal samples of the traces relating to the next frame. The processing time of the calculation card 12 is sufficiently short to enable the processing to be completed within the period of acquisition of the sampled signal relating to the next frame. Thus real-time operation is obtained.

The calculation card proceeds to carry out the discrete wavelet transform of the sampled signal in accordance with the coefficients previously set in the filter 7 by the DSP 9. The use of a programmable integrated filter makes it possible to select and set the filter coefficients by means of the processor 9 as a function both of the applied discrete wavelet transform and of the frequency band which is to be examined. By using different families and, within each family, different orders of the wavelet function, results are obtained which are more or less satisfactory in terms of signal encoding, including encoding as a function of the type of information which is to be extracted from the signal. The discrete wavelet transform using the Daubechies wavelet of order 16 (FIG. 3), with which the results shown in FIGS. 5 and 6 are obtained, is particularly suitable in the case of ultrasonic signals, but is not the only possible function which may be used.

Additionally, by using the processor 9 it is possible to program the filter 7 on different occasions so that it operates on any of the relevant spectral subbands; alternatively, it is possible to program it in such a way that it acts as any of the parallel filters shown in FIG. 8. Thus, by acting on a suitable interface, the operator can select the relevant spectral band and analyze the spectral content of the ultrasonic signal in this band. Again by operating through the same interface, he can in sequence set different parameters for the filter 7 and examine the image obtained in different spectral bands.

Naturally, there is no reason why use should not be made of a plurality of integrated filters in parallel, controlled by a processor, which make it possible to obtain an analysis of the signal sampled simultaneously in more than one spectral band.

At the end of the calculation, the memory 11 of the calculation card 12 contains the coefficients relating to the selected subband, which may be processed in two different ways:

1. by means of a D/A conversion, the signal obtained may be sent to the analog stages of the ultrasonic scanner and processed in a similar way to the original ultrasonic signal, for example by superimposing the image supplied by the wavelet transform on the conventional ultrasonic scanning image; or
2. the calculated coefficients may be sent directly to the digital display system, avoiding the D/A conversion.

It is to be understood that the drawing shows only an example provided solely as a practical demonstration of the invention, and that said invention may be varied in its forms and dispositions without departing from the scope of the guiding principle of the invention. Any presence of reference numbers in the attached claims has the purpose of facilitating the reading of the claims with reference to the description and to the drawing, and does not limit the scope of protection represented by the claims.

What is claimed is:

1. A method for producing an ultrasound image of a body, the method comprising the steps of:

transmitting an ultrasound signal in an investigated portion of the body;

receiving a response signal from the body;

filtering said response signal into a plurality of sub-band signals;

determining an energy content of each of said sub-band signals;

displaying spectral maps of said energy content of said sub-band signals.

2. The method in accordance with claim 1, wherein:
   said response signal includes radio frequencies and said response signal is digitized to obtain a digitized signal, said digitized signal is filtered into said plurality of sub-bands.

3. The method in accordance with claim 1, wherein:
   said spectral maps are separate from each other.

4. The method in accordance with claim 1, wherein:
   said displaying includes displaying fewer than all said spectral maps at one time.

5. The method in accordance with claim 1, wherein:
   said displaying includes superimposing two of said spectral maps.

6. A method for producing an ultrasound image of a body, the method comprising the steps of:

transmitting an ultrasound signal in an investigated portion of the body;

receiving a response signal from the body;

filtering said response signal into a plurality of sub-band signals;

applying a time-frequency transform to said plurality of sub-band signals to obtain a plurality of spectral maps, each of said spectral maps corresponding to one of said sub-band signals;

displaying said spectral maps.

7. The method in accordance with claim 6, wherein:
   said time-frequency transform is a Discrete Wavelet Transform (DWT).

8. The method in accordance with claim 7, wherein:
   said DWT is a Daubechies Wavelet transform of order 16.

9. The method in accordance with claim 6, wherein:
   said spectral maps are separate from each other.

10. The method in accordance with claim 6, wherein:
    said displaying includes displaying fewer than all said spectral maps at one time.

11. A method for producing an ultrasound image of a body, the method comprising the steps of:

transmitting an ultrasound signal in an investigated portion of the body;

receiving a response signal from the body;

filtering said response signal with a subband encoding algorithm to obtain a spectral content of said response signal at a plurality of frequency subbands;

generating a plurality of frequency maps, each of said frequency maps corresponding to said spectral content of one of said plurality of frequency subbands;

displaying said frequency maps.

12. The method in accordance with claim 11, wherein:
    said frequency maps are separate from each other.

13. The method in accordance with claim 11, wherein:
    said displaying includes displaying fewer than all said spectral maps at one time.

14. A method for producing an ultrasound image of a body, the method comprising the steps of:

transmitting an ultrasound signal in an investigated portion of the body;

receiving a response signal from the body;

filtering said response signal to obtain a plurality of sets of coefficients representing a spectral content of said response signal at a plurality of frequency bands;

generating a plurality of spectral maps, each of said spectral maps corresponding to one of said plurality of sets of coefficients.

15. The method in accordance with claim 14, wherein:

said filtering is performed with a subband encoding algorithm.

16. The method in accordance with claim 14, wherein:

said filtering is performed by applying a Discrete Wavelet Transform to said response signal.

17. The method in accordance with claim 14, wherein:

said spectral maps are separate from each other and display separate said sets of coefficients.

18. An ultrasonic imaging system comprising:

a transducer to emit an ultrasound signal into a body and receive a response signal from the body;

a filter for filtering said response signal into a plurality of sub-band signals and obtaining spectral content for each of said plurality of sub-band signals;

display means for generating and displaying spectral maps corresponding to said spectral content of said sub-band signals.

19. An ultrasonic imaging system comprising:

a transducer to emit an ultrasound signal into a body and receive a response signal from the body;

a filter means for applying a discrete wavelet transform to said response signal and obtaining a plurality of sets of coefficients representing a spectral content of each of said response signal at a plurality of frequency bands;

display means for generating and displaying spectral maps corresponding to said spectral content of said sub-band signals.

20. The system in accordance with claim 19, further comprising:

a sample and acquisition card connected to said transducer to sample and digitalize said response signal and generate a digitized signal, said filter means applying said discrete wavelet transform to said digitized signal.

* * * * *